(12) United States Patent
Dilluvio et al.

(10) Patent No.: US 7,857,373 B2
(45) Date of Patent: Dec. 28, 2010

(54) AUTOMOTIVE VEHICLE CONVERTIBLE ROOF SYSTEM

(75) Inventors: Christopher J. Dilluvio, Farmington Hills, MI (US); Bradley R. Garska, Saline, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 245 days.

(21) Appl. No.: 12/120,571

(22) Filed: May 14, 2008

(65) Prior Publication Data

US 2008/0284200 A1 Nov. 20, 2008

Related U.S. Application Data

(60) Provisional application No. 60/930,218, filed on May 15, 2007.

(51) Int. Cl.
*B60J 7/20* (2006.01)
(52) U.S. Cl. .................. 296/107.09; 296/116
(58) Field of Classification Search ............ 296/107.01, 296/170.07, 107.09, 146.14, 121, 116
See application file for complete search history.

(56) References Cited

U.S. PATENT DOCUMENTS

| | | |
|---|---|---|
| 1,294,148 A | 2/1919 | Oliver |
| 1,426,129 A | 8/1922 | Velo |
| 1,463,193 A | 7/1923 | Botella |
| 2,193,091 A | 3/1940 | Fish |
| 2,267,471 A | 12/1941 | Keller |
| 2,592,512 A | 4/1952 | Fodermaier, Jr. |
| 2,768,857 A | 10/1956 | Albrecht |
| 2,794,672 A | 6/1957 | Burzi |
| 3,002,785 A | 10/1961 | Larché |
| 3,159,422 A | 12/1964 | Lautenbach |
| 3,473,842 A | 10/1969 | Bracey et al. |
| 3,536,354 A | 10/1970 | Ingram |
| 4,573,732 A | 3/1986 | Muscat |
| 4,711,485 A | 12/1987 | Maebayashi et al. |
| 4,720,133 A | 1/1988 | Alexander et al. |
| 4,720,134 A | 1/1988 | Seifert |
| 4,741,571 A | 5/1988 | Godette |
| 4,778,215 A | 10/1988 | Ramaciotti |
| 4,784,428 A | 11/1988 | Moy et al. |
| 4,828,317 A | 5/1989 | Muscat |

(Continued)

FOREIGN PATENT DOCUMENTS

FR 459931 11/1913

(Continued)

OTHER PUBLICATIONS

"Dream Wheels, Toyota Lets Automotive Creativity Run Free at SEMA 2007," This Week From Toyota, AutoWeek, Advertisement Oct. 22, 2007.

(Continued)

*Primary Examiner*—Joseph D Pape
(74) *Attorney, Agent, or Firm*—Harness, Dickey & Pierce, P.L.C.

(57) ABSTRACT

An automotive vehicle employs a convertible roof system. The convertible roof system can include a roof cover and a top stack mechanism operable between raised and stowed positions. At least one roof bow can move between first and second positions relative to a forwardmost roof rail.

41 Claims, 9 Drawing Sheets

U.S. PATENT DOCUMENTS

| | | |
|---|---|---|
| 4,840,419 A | 6/1989 | Kolb |
| 4,929,015 A | 5/1990 | Bauer |
| 4,958,882 A | 9/1990 | Kolb |
| 5,004,291 A | 4/1991 | Bauer et al. |
| 5,026,110 A | 6/1991 | Koop et al. |
| 5,033,789 A | 7/1991 | Hayashi et al. |
| 5,118,158 A | 6/1992 | Truskolaski |
| 5,209,544 A | 5/1993 | Benedetto et al. |
| 5,251,952 A | 10/1993 | Guckel et al. |
| 5,301,987 A | 4/1994 | Tokarz et al. |
| 5,318,337 A | 6/1994 | Götz et al. |
| 5,427,429 A | 6/1995 | Piontek et al. |
| 5,429,409 A | 7/1995 | Corder et al. |
| 5,456,516 A | 10/1995 | Alexander et al. |
| 5,542,735 A | 8/1996 | Furst et al. |
| 5,593,202 A | 1/1997 | Corder et al. |
| 5,624,149 A | 4/1997 | Tokarz |
| 5,625,981 A | 5/1997 | Klein et al. |
| 5,678,881 A | 10/1997 | Tokarz |
| 5,685,596 A | 11/1997 | Tokarz et al. |
| 5,743,587 A | 4/1998 | Alexander et al. |
| 5,758,923 A | 6/1998 | Kolb |
| 5,765,904 A | 6/1998 | Aydt et al. |
| 5,769,483 A | 6/1998 | Danzl et al. |
| 5,779,299 A | 7/1998 | Purcell et al. |
| 5,785,375 A | 7/1998 | Alexander et al. |
| 5,810,422 A | 9/1998 | Corder et al. |
| 5,899,521 A | 5/1999 | Pfertner et al. |
| 5,944,375 A | 8/1999 | Schenk et al. |
| 6,033,008 A | 3/2000 | Mattila |
| 6,042,174 A | 3/2000 | Durrani |
| 6,139,087 A | 10/2000 | Wolfmaier et al. |
| 6,237,986 B1 | 5/2001 | Neubrand et al. |
| 6,328,372 B1 | 12/2001 | Just |
| 6,390,531 B1 | 5/2002 | Schutt |
| 6,398,296 B1 | 6/2002 | Mayer et al. |
| 6,412,860 B1 | 7/2002 | Reinsch |
| 6,416,111 B1 | 7/2002 | Neubrand |
| 6,416,121 B1 | 7/2002 | Miklosi |
| 6,419,295 B1 | 7/2002 | Neubrand |
| 6,428,090 B1 | 8/2002 | Reinsch et al. |
| 6,454,342 B2 | 9/2002 | Heselhaus et al. |
| 6,464,284 B2 | 10/2002 | Neubrand |
| 6,520,560 B2 | 2/2003 | Schutt et al. |
| 6,550,842 B1 | 4/2003 | Halbweiss et al. |
| 6,561,566 B2 | 5/2003 | Dintner et al. |
| 6,568,751 B2 | 5/2003 | Reinsch |
| 6,623,065 B2 | 9/2003 | Halbweiss et al. |
| 6,666,494 B2 | 12/2003 | Antreich |
| 6,695,384 B2 * | 2/2004 | Obendiek et al. ...... 296/107.09 |
| 6,722,723 B2 | 4/2004 | Obendiek |
| 6,729,672 B2 | 5/2004 | Neubrand |
| 6,755,457 B2 | 6/2004 | Grubbs |
| RE38,546 E | 7/2004 | Corder et al. |
| 6,793,267 B2 | 9/2004 | Hesselhaus |
| 6,802,554 B1 | 10/2004 | Just et al. |
| 6,863,333 B2 | 3/2005 | Heller et al. |
| 7,032,951 B2 | 4/2006 | Powell |
| 7,104,587 B2 | 9/2006 | MacNee, III et al. |
| 7,118,160 B2 | 10/2006 | Willard |
| 7,163,255 B2 | 1/2007 | Rawlings et al. |
| 7,614,686 B2 | 11/2009 | Robertson et al. |
| 2002/0125731 A1 | 9/2002 | Hasselgruber et al. |
| 2003/0038501 A1 | 2/2003 | Heselhaus |
| 2004/0232721 A1 | 11/2004 | Rawlings et al. |
| 2005/0140165 A1 | 6/2005 | Heller et al. |
| 2006/0061129 A1 | 3/2006 | Dilluvio |
| 2006/0097542 A1 | 5/2006 | Dilluvio |
| 2006/0152033 A1 | 7/2006 | Schartner et al. |
| 2007/0284909 A1 | 12/2007 | Dilluvio |

FOREIGN PATENT DOCUMENTS

| | | |
|---|---|---|
| FR | 1382296 | 12/1964 |
| GB | 727661 | 4/1955 |

OTHER PUBLICATIONS

"Drop-top Rolls", Nov. 22, 2004, AutoWeek, p. 4.

9 photographs of a convertible roof mechanism believed to have been used on Cadillac Eldorado Convertibles for the 1971-1976 model years.

MacKenzie, Angus, "Sunshine Superstar", May, 2005, Motor Trend, pp. 74-78.

Vaughn, Mark, "Chrysler 300C Cabriolet", (Newport Convertible Engineering, Inc.), Nov. 22, 2004, AutoWeek, p. 4.

9 color photographs of a convertible roof mechanism believed to have been used on Cadillac Eldorado Convertibles for the 1971-1976 model years.

* cited by examiner

AUTOMOTIVE VEHICLE CONVERTIBLE ROOF SYSTEM

CROSS-REFERENCE TO RELATED APPLICATIONS

This application claims the benefit of U.S. Provisional Application No. 60/930,218, filed on May 15, 2007. The disclosure of the above application is incorporated herein by reference.

BACKGROUND AND SUMMARY

This invention relates generally to a convertible roof and more particularly to a soft-top convertible roof system.

It is known to provide a soft-top convertible roof for an automotive vehicle. For example, convertible roof constructions are disclosed in U.S. Patent Publication No. 2006/0152033 entitled "Convertible Roof Bow Control Mechanism" which published on Jul. 13, 2006, and U.S. Pat. No. 4,720,133 entitled "Convertible Top Structure" which issued to Alexander et al. on Jan. 19, 1988; both of which are incorporated by reference herein.

In some automotive vehicles, the stowage space for a convertible roof can be limited. For example, in hatchbacks or similar style vehicles, the stowage space behind the seating area can be limited. The limited stowage space may prevent any portion of the convertible roof from being stowed in the stowage space when in the retracted or open position. In some vehicles, the limited stowage space may allow only a portion of the convertible roof to be stowed in the stowage space when in the retracted or open position. In either case, the entire convertible roof or the remainder of the convertible roof resides above the stowage space and may reside above the beltline of the vehicle when in the retracted or open position. In such vehicles, the convertible roof can protrude rearwardly a significant distance due to the limited stowage space. The rearward extension of the convertible roof when in the retracted or open position can provide an aesthetically undesirable appearance.

An automotive vehicle convertible roof system according to one aspect of the present invention includes a cover and a top stack mechanism operable between a raised position and a stowed position. The top stack mechanism includes a forwardmost roof rail and at least one transversely extending roof bow. The at least one roof bow is operable to move between first and second positions relative to the forwardmost roof rail. An entirety of the at least one roof bow may move vertically relative to the forwardmost roof rail when moving between the first and second positions.

In another aspect of the present invention, the top stack mechanism includes a forwardmost roof rail and a forwardmost transversely extending roof bow which is operable to move between first and second positions relative to the forwardmost roof rail. The forwardmost roof bow moves between the first and second positions simultaneously with movement of the top stack mechanism between the raised and stowed positions.

In still another aspect of the present invention, a top stack mechanism includes a pair of transversely spaced apart forwardmost roof rails and a pair of transversely spaced apart rearmost roof rails. At least one transversely extending roof bow is operable to move between first and second positions relative to the pair of forwardmost roof rails. The top stack mechanism also includes at least one actuator which is operable to drive movement of the top stack mechanism between the raised and stowed positions and is also operable to drive movement of the at least one roof bow between the first and second positions.

In another aspect of the present invention, a method of operating an automotive vehicle convertible roof system includes moving at least one roof bow relative to the forwardmost roof rail from a first position to a second position and moving an entirety of the at least one roof bow vertically relative to the forwardmost roof rail when moving the at least one roof bow between the first and second positions.

In yet another aspect of the present invention, the method of operating an automotive vehicle convertible roof system can include moving the top stack mechanism between the raised position and the stowed position and moving the forwardmost roof bow relative to the forwardmost roof rail between first and second positions simultaneously with movement of the top stack mechanism between the raised and stowed positions.

In still another aspect of the present invention, a method of operating an automotive vehicle convertible roof system may include moving the top stack mechanism between the raised and stowed positions with at least one actuator and moving the at least one roof bow relative to the forwardmost pair of roof rails between first and second positions with the at least one actuator.

The convertible roof system and methods of operating same according to the present invention may advantageously provide a convertible roof system for an automotive vehicle having a limited stowage space rearward of the passenger seating area. The convertible roof system and methods may provide an aesthetically pleasing appearance when the top stack mechanism is in the stowed position. The convertible roof system and methods may advantageously reduce the extension of the convertible roof rearwardly of the vehicle when in the stowed or open position. The movement of the roof bow relative to the forwardmost roof rail may advantageously reduce the extension of the convertible roof system rearwardly of the vehicle when in the retracted or open position. The convertible roof system and methods may advantageously utilize at least a portion of the stowage space rearward of the seating area. The simultaneous movement of the roof bow relative to the forwardmost roof rails along with the movement of the top stack mechanism may advantageously facilitate the retraction and extension process of the convertible roof system. The ability of at least one actuator to move both the top stack mechanism between the raised and stowed positions and a roof bow between first and second positions relative to a forwardmost roof rail may advantageously provide a relatively inexpensive design while producing the differing motions. Additionally, the convertible roof system and methods of operating same can advantageously provide a construction of a simple design that is relatively inexpensive to produce.

Additional objects, advantages, and features of the present invention will become apparent from the following description and the pending claims, taken in conjunction with the accompanying drawings. It should be understood that the detailed description and the specific examples are intended for purposes of illustration only and are not intended to limit the scope of the invention.

DETAILED DESCRIPTION

Figure 1:
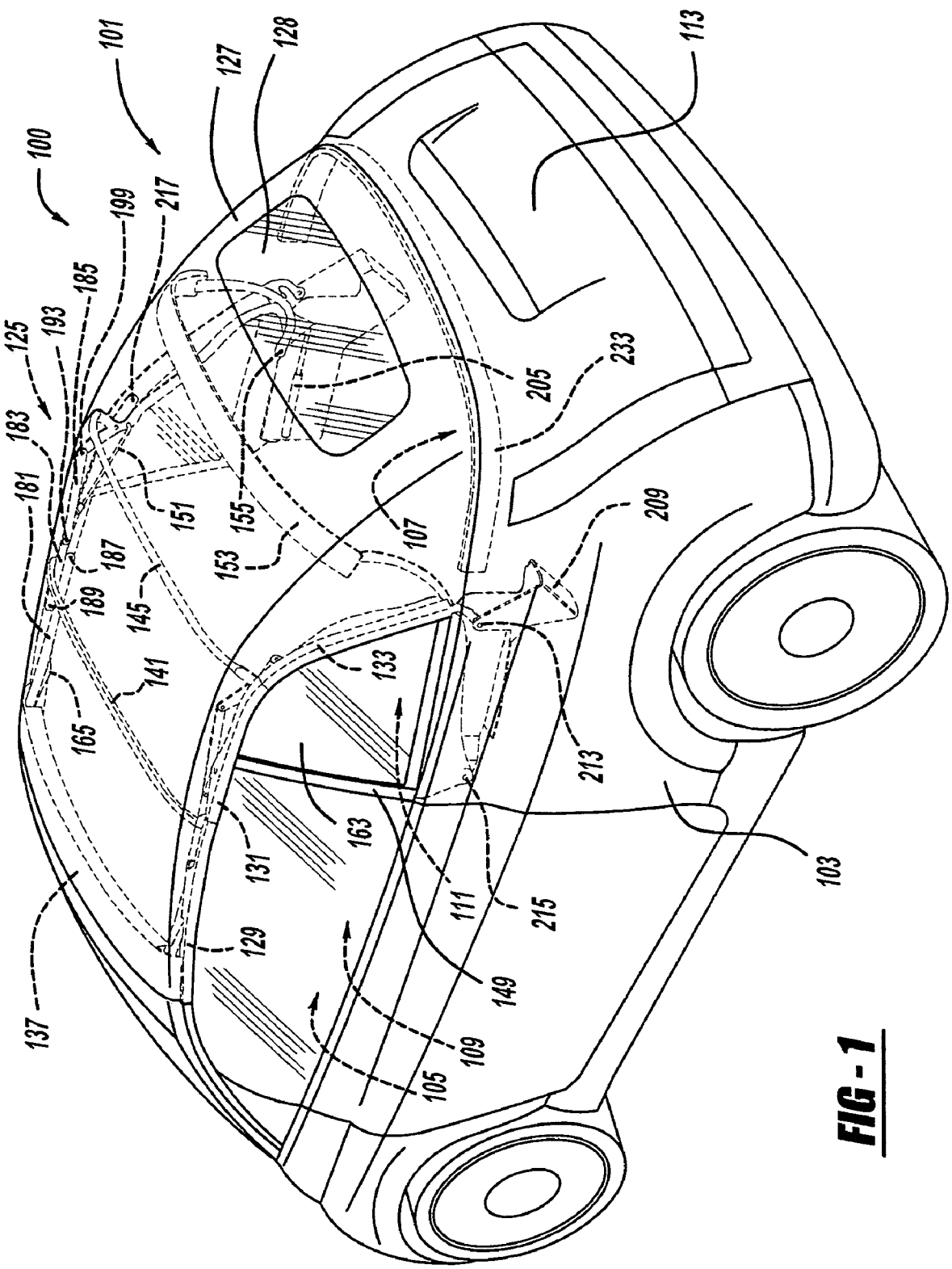
FIG. 1 is a perspective view of a vehicle having a convertible roof of the present invention, in a fully raised position.

The following description is merely exemplary in nature and is not intended to limit the present disclosure, application, or uses.

In the figures, the convertible roof system and the associated top stack mechanism are shown symmetrical about a longitudinal, fore-and-aft center line (not shown) of the vehicle. The center line, thus, also serves as a longitudinal center line of the convertible roof system and the top stack mechanism and its associated linkages and components. The top stack mechanism includes right and left roof linkages on the respective right and left sides of the vehicle. For brevity, at times only one side of the top stack mechanism and the convertible roof system may be shown and/or discussed. However, it should be understood that the other side linkages are also provided as part of the top stack mechanism of the convertible roof system and are mirrored images of the side depicted and/or discussed. Also, when using the terms "fore" and "aft," "front" and "back," "forward" and "rearward," and "forwardmost" and "rearmost" in describing the movement and components of the top stack mechanism and the convertible roof system, such reference refers to the orientation of the components when the top stack mechanism and the convertible roof system are in the fully raised and operative position.

Referring to FIGS. 1-9, a vehicle 100 having a preferred embodiment of a convertible roof system 101 according to the present invention is shown. Vehicle 100 has a body 103 with a passenger compartment 105 and a stowage compartment 107 rearward of passenger compartment 105. Passenger compartment 105 may include front and rear passenger seating areas 109, 111. Vehicle 100 can include a rear access door or hatch 113 that can be opened and closed to allow access to stowage compartment 107 from a rear of vehicle 100. Stowage compartment 107 may be accessible from passenger compartment 105. Stowage compartment 107 may receive a portion of convertible roof system 101 when in the retracted position. Stowage compartment 107 can thus serve as at least a partial storage space for the convertible roof system 101 or for other items. Vehicle 100 may have a roll bar 115.

Figure 2:
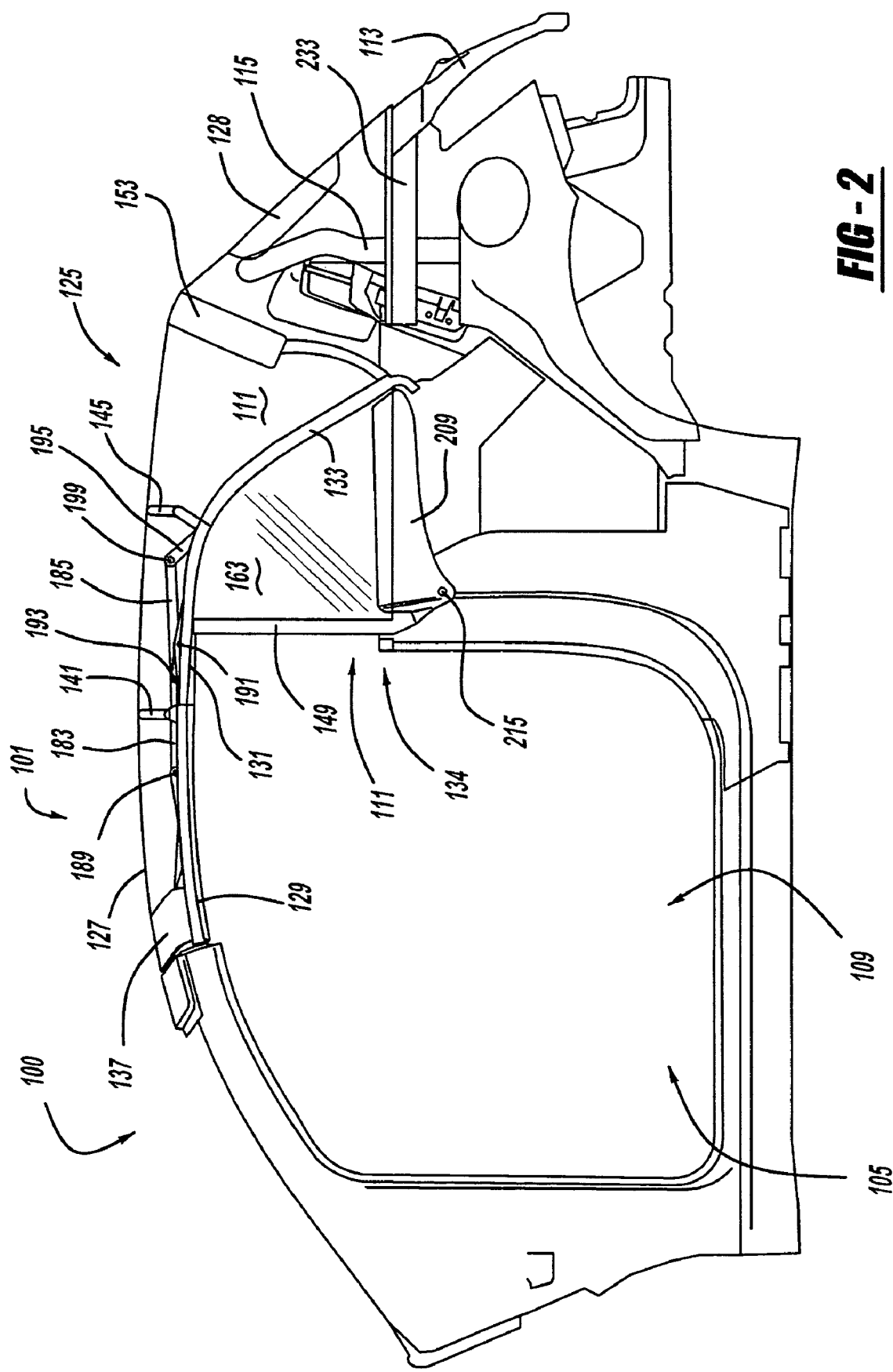
FIG. 2 is a fragmented side elevational view of the convertible roof of FIG. 1.
Figure 3:
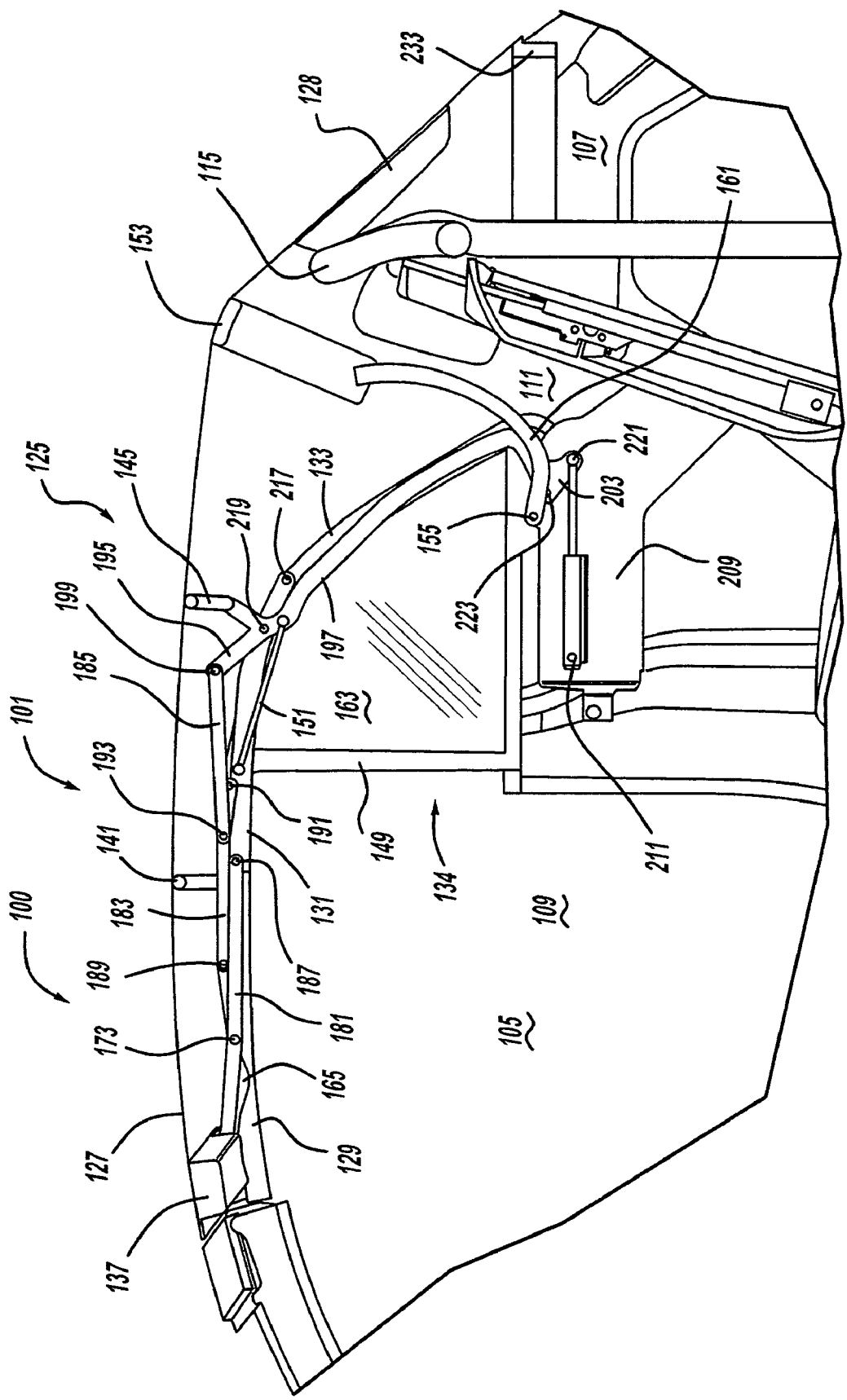
FIG. 3 is a fragmented cross-sectional side elevational view of the convertible roof of FIG. 2 from inside the vehicle.
Figure 4:
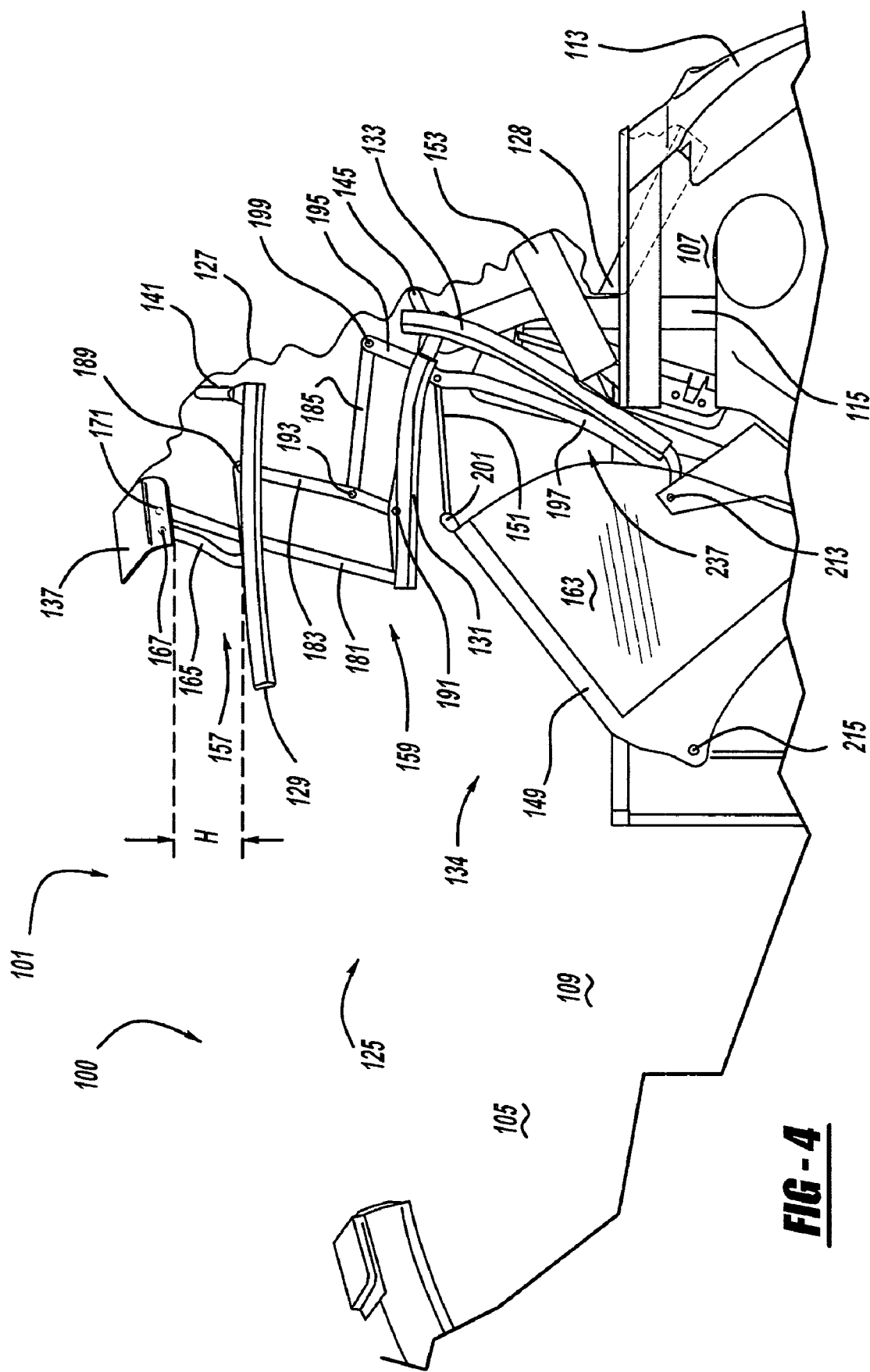
FIG. 4 is a fragmented side elevational view of the convertible roof of FIG. 2 in a partially retracted position.
Figure 5:
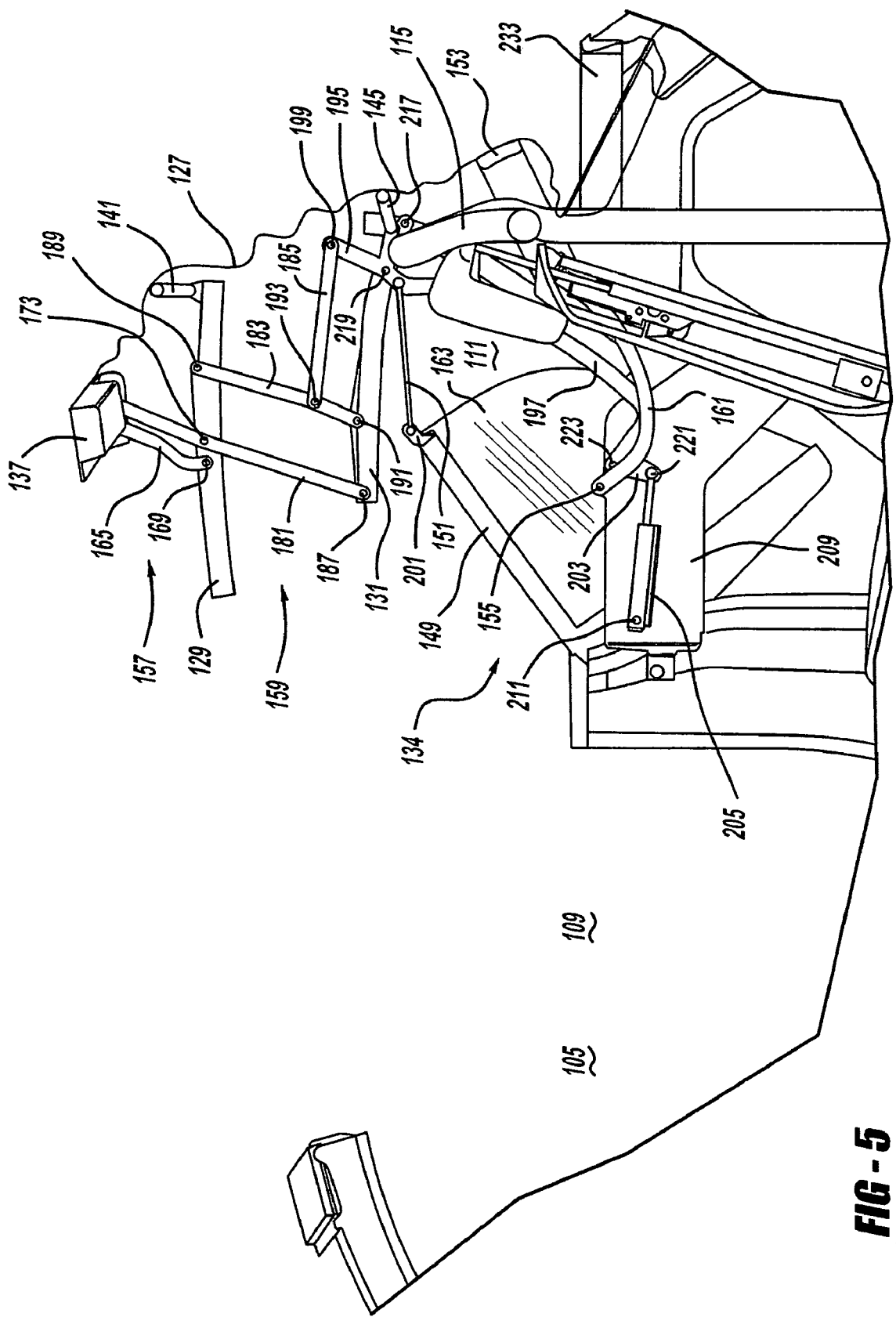
FIG. 5 is a fragmented cross-sectional side elevational view of the convertible roof of FIG. 4 from inside the vehicle.
Figure 6:
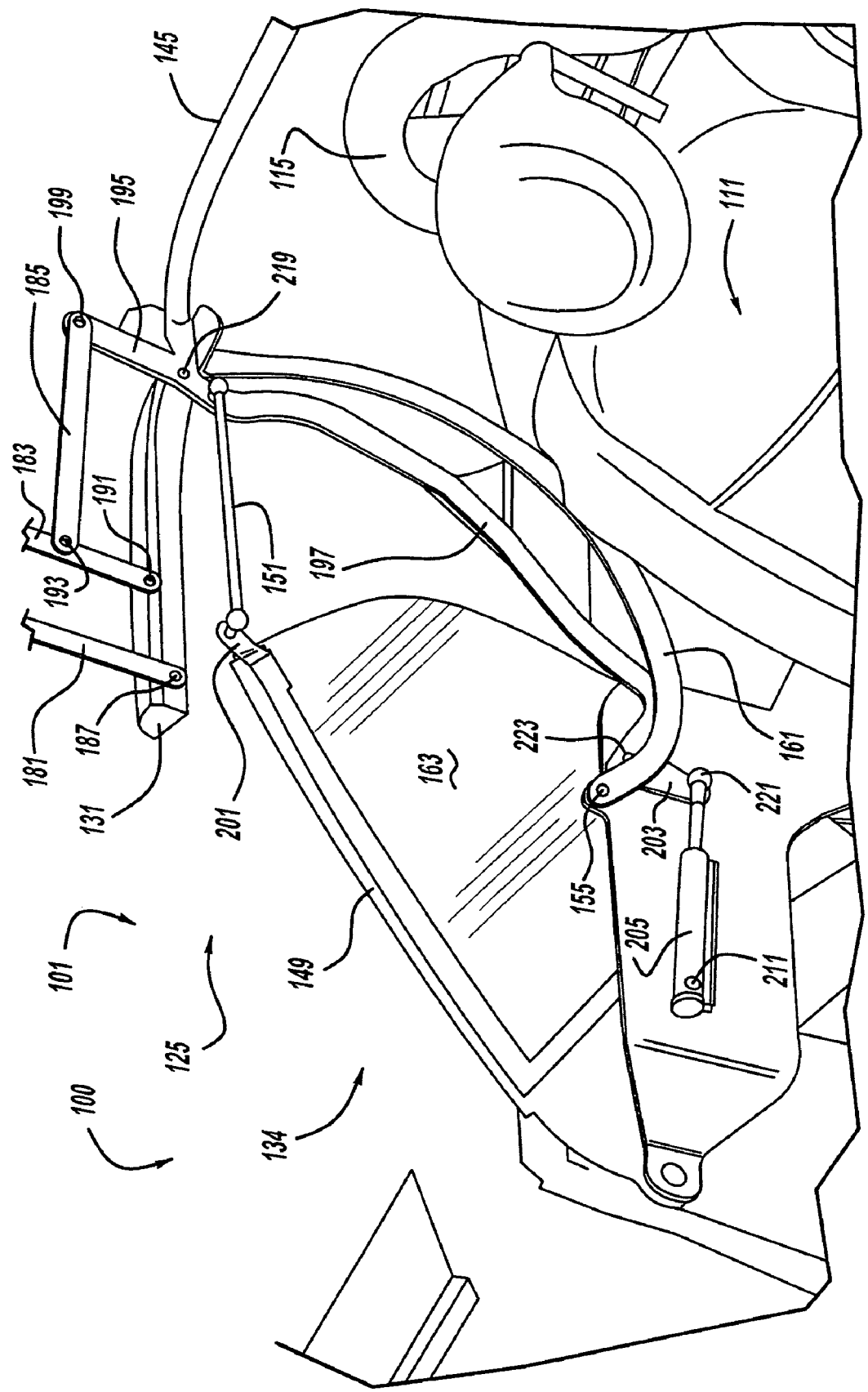
FIG. 6 is a fragmented perspective view of the convertible roof of FIG. 5.
Figure 7:
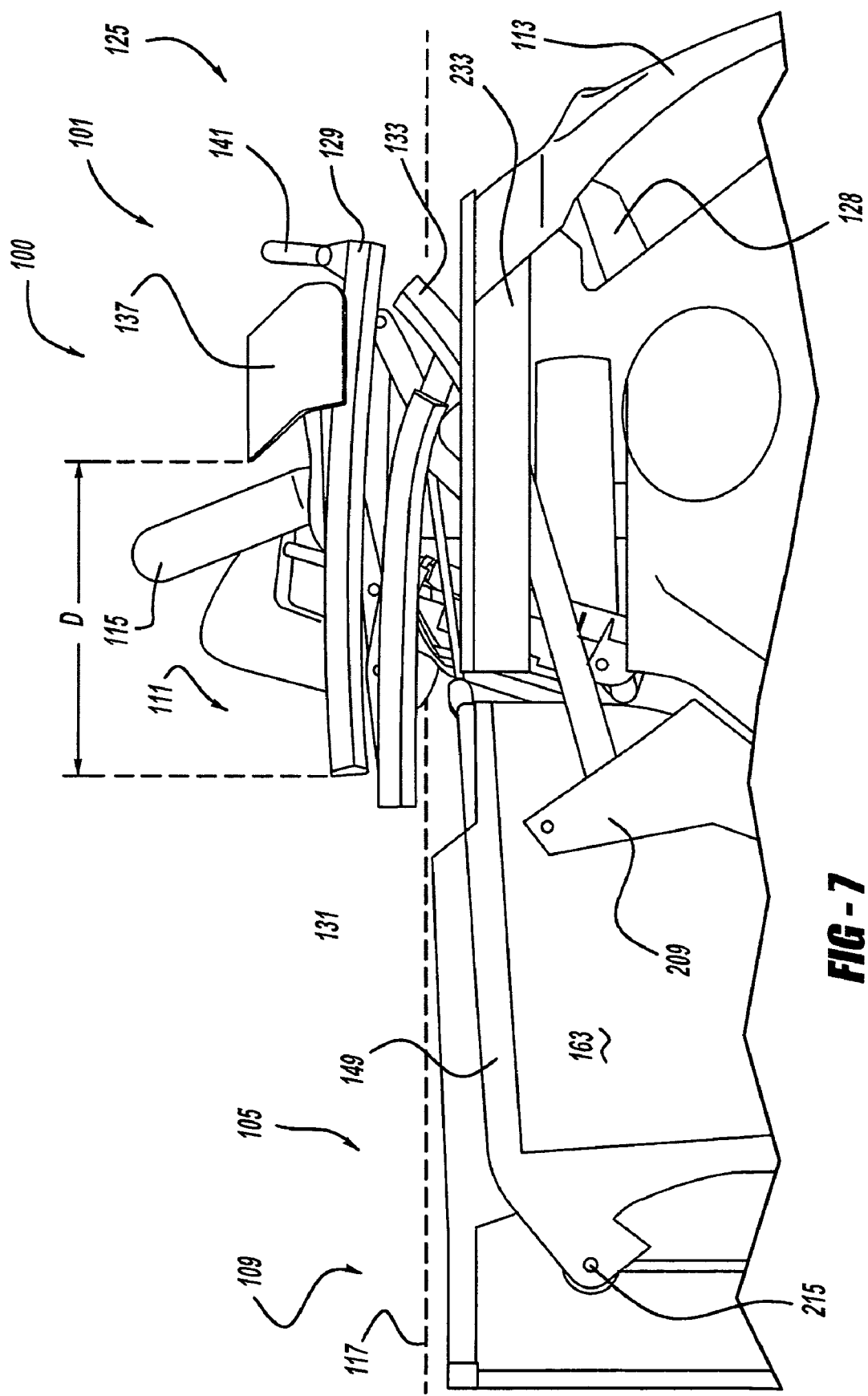
FIG. 7 is a fragmented side elevational view of the convertible roof of FIG. 2 in the fully retracted position.
Figure 8:
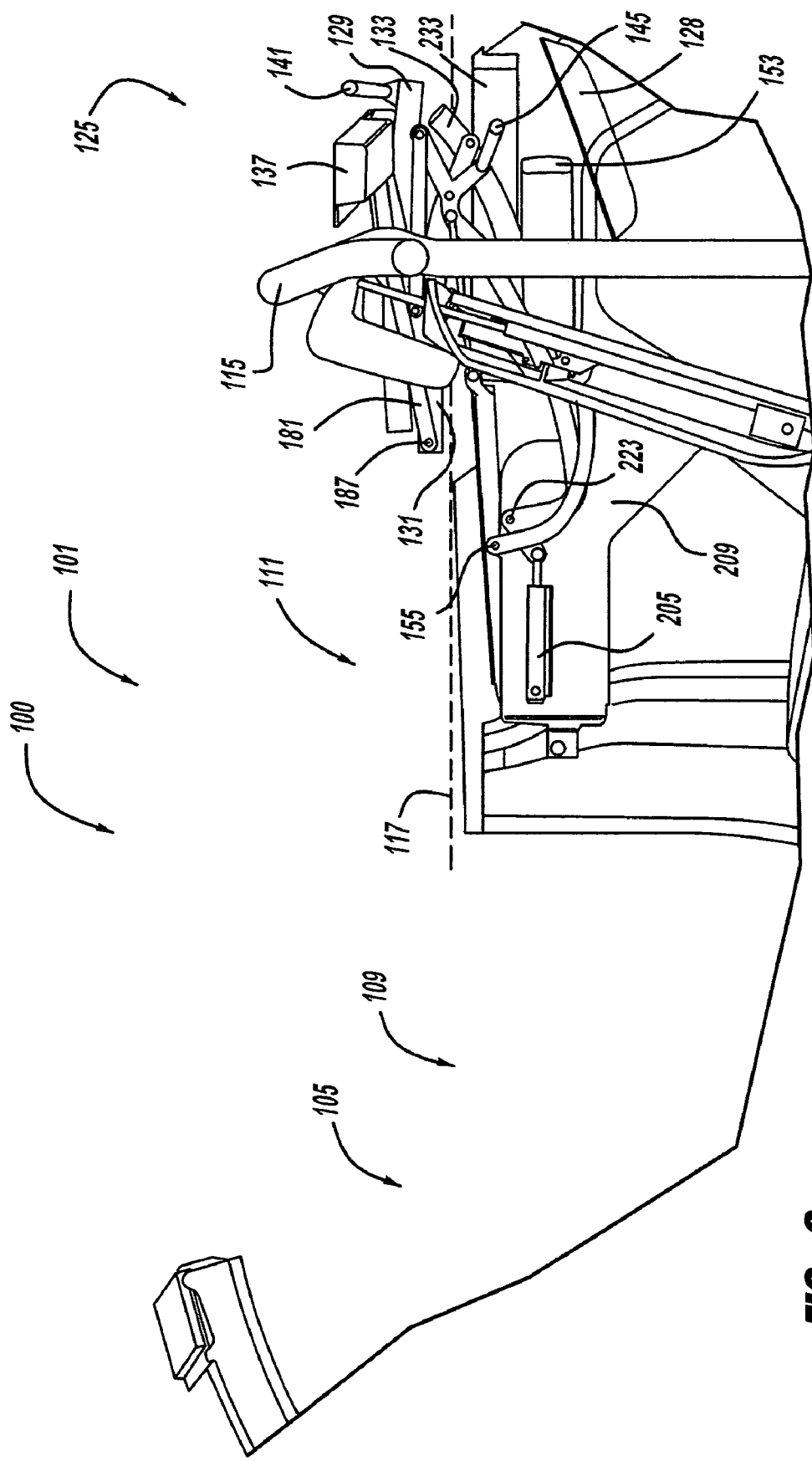
FIG. 8 is a fragmented cross-sectional side elevational view of the convertible roof of FIG. 7 from inside the vehicle.
Figure 9:
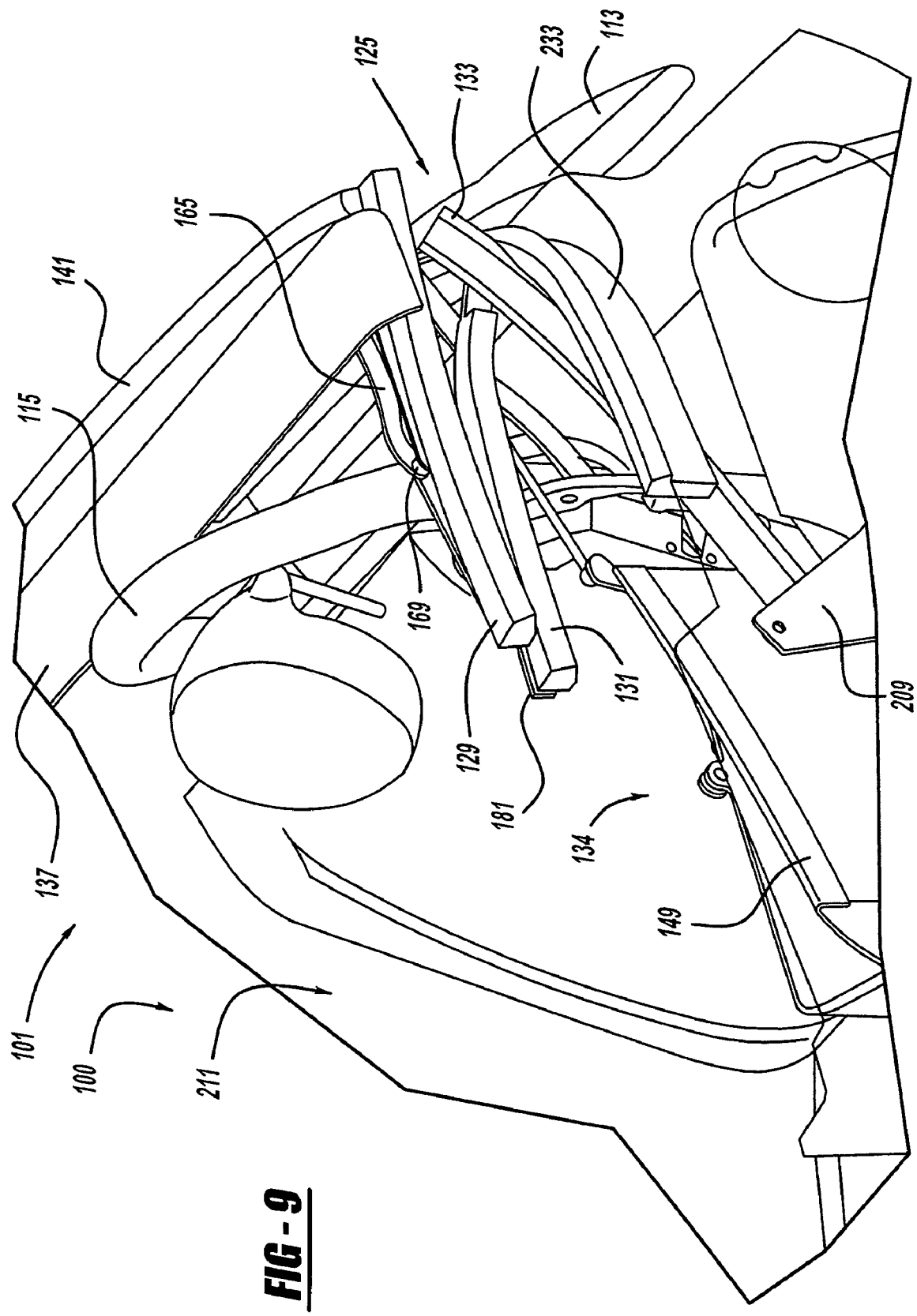
FIG. 9 is a fragmented perspective view of the convertible roof of FIG. 2 in the fully retracted position.

Convertible roof system 101 is of the type utilizing a folding or top stack mechanism 125 and a roof cover 127 and is operable between a fully raised and operative position, as shown in FIGS. 1-3, through intermediate positions, such as those shown in FIGS. 4-6, to a fully stowed or retracted position, as shown in FIGS. 7-9. Roof cover 127 can be made from a pliable material, such as vinyl, canvass, or a polyester fabric, by way of non-limiting example. If desired, roof cover 32 can include a hard or rigid portion that, optionally, can be covered by the same material that comprises a soft portion of the cover to give a uniform appearance. A backlite 128 is attached to roof cover 127 and is not directly coupled to top stack mechanism 125. For example, reference should be made to U.S. Pat. No. 5,887,936, entitled "Backlite System for Use in an Automotive Vehicle Convertible Roof," by Cowsert, and U.S. Pat. No. 6,102,467, entitled "Backlite Retention System for Use in an Automotive Vehicle Convertible Roof," by Laurain et al., both of which are herein incorporated by reference. Backlite 128 may be made of either a rigid material, such as glass, or a pliable transparent material, such as vinyl, by way of non-limiting example.

Top stack mechanism 125 includes a pair of front roof rails 129, center roof rails 131, and rear roof rails 133. A forwardmost or number one roof bow 137 is pivotally coupled to front roof rails 129 and extends transversely across vehicle 100 adjacent a front header above the front windshield when in the fully raised position. Number one roof bow 137 can be cast aluminum, by way of non-limiting example. A number two roof bow 141 is coupled to a rear portion of front roof rails 129 and extends transversely across vehicle 100. A third roof bow 145 is coupled to a balance link 197 and extends transversely across vehicle 100. A fourth roof bow 153 includes a curved link 161 and is pivotally coupled to a main bracket 209 at pivot 155 and extends transversely across vehicle 100. Number four roof bow 153 can thereby pivot about pivot 155 during the retraction and extension of convertible roof system 101. A fifth roof bow 233 is pivotally coupled to opposite sides of vehicle 100 and extends transversely across vehicle 100. Second, third, fourth, and fifth roof bows 141, 145, 153, 233 can be extruded aluminum, by way of non-limiting example.

According to the present invention, number one roof bow 137 can move relative to front roof rails 129. Specifically, number one roof bow 137 can move from a first position adjacent the front portion of front roof rail 129, as shown in FIGS. 1-3, to a second position adjacent the rear portion of front roof rail 129 and number two roof bow 141, as shown in FIGS. 7-9. This movement of number one roof bow 137 can advantageously reduce the packaging space required for convertible roof system 101 when in the fully retracted or open position. Additionally, this movement can allow convertible roof system 101 to have an aesthetically pleasing appearance when in the retracted position.

A first four-bar linkage assembly 157 enables the motion of number one roof bow 137 relative to front roof rails 129. First linkage assembly 157 includes a first link 165 having one end pivotally coupled to number one roof bow 137 at pivot 167 and the other end pivotally coupled to an intermediate portion of front roof rail 129 at pivot 169. A second link 181 has one end pivotally coupled to number one roof bow 137 at pivot 171 and an intermediate portion pivotally coupled to an intermediate portion of front roof rail 129 at pivot 173 which is rearward of pivot 169. First linkage assembly 157 thereby includes number one roof bow 137, second link 181, front roof rail 129, and first link 165 and is defined by pivots 171, 173, 169, 167.

Front roof rail 129 is pivotally coupled to center roof rail 131 by a second four-bar linkage assembly 159. Second linkage assembly 159 includes second link 181, an end thereof which is pivotally coupled to a front portion of center roof rail 131 at pivot 187. Second linkage assembly 159 also includes a third link 183 having one end pivotally coupled to front roof rail 129 at pivot 189 rearward of pivot 173 and with its other end pivotally coupled to center roof rail 131 at pivot 191 rearward of pivot 187. Second linkage assembly 159 thereby includes front roof rail 129, third link 183, center roof rail 131, and second link 181 and is defined by pivots 189, 191, 187, 173. Second linkage assembly 159 allows front roof rail 129 to move relative to center roof rail 131 during the retraction and extension of convertible roof system 101, as described below. Second linkage assembly 159 drives movement of first linkage assembly 157 through second link 181.

A drive link 185 is coupled to second linkage assembly 159 and drives movement of front roof rail 129 relative to center roof rail 131. One end of drive link 185 is pivotally coupled to an intermediate portion of third link 183 at pivot 193 while the other end is pivotally coupled to an extension arm 195 of balance link 197 at pivot 199. Balance link 197 is pivotally coupled to a rear portion of center roof rail 131 at pivot 219. As a result, movement of balance link 197 relative to center roof rail 131 about pivot 219 can drive motion of drive link 185, thereby driving movement of second linkage assembly 159.

A curved bottom end of balance link 197 is defined in part by a bell crank 203. A proximal end of bell crank 203 is pivotally coupled to an end of a rod projecting from an actuator 205 at pivot 221. Actuator 205 is pivotally coupled to bracket 209 at pivot 211. An intermediate section of bell crank 203 is pivotally coupled to bracket 209 at pivot 223. Movement of the rod of actuator 205 can thereby drive rotation of balance link 197 about pivot 223, which in turn drives motion of convertible roof system 101, as described below. Actuator 205 can take a variety of forms. For example, as shown, actuator 205 can be a fluidic actuator with a rod that expands and contracts in response to fluid flow. For example, actuator 205 can be a hydraulic actuator, a pneumatic actuator, or the like, by way of non-limiting example.

A rear portion of center roof rail 131 is pivotally coupled to a front portion of rear roof rail 133 at pivot 217. The other end of rear roof rail 133 is pivotally coupled to bracket 209 at pivot 213. With this arrangement, a third four-bar linkage assembly 237 is formed by center roof rail 131, rear roof rail 133, bracket 209, and balance link 197 and is defined by pivots 217, 213, 223, 219. Third linkage assembly 237 can thereby drive motion of convertible roof system 101 in response to movement of actuator 205, as described below.

A quarter window assembly 134 includes a quarter window frame 149 and an adhesively bonded glass quarter window panel 163 attached thereto. A ball joint linkage member 151 has one end coupled to a tab 201 extending from a top of quarter window frame 149 in a ball-and-socket manner. Quarter window frame 149 is pivotally coupled to bracket 209 at pivot 215. Quarter window assembly 134 can thereby be driven between a raised position, as shown in FIGS. 1-3, through intermediate positions, as shown in FIGS. 4-6, to a fully stowed position, as shown in FIGS. 7-9, as a result of rotation of balance link 197 about pivot 223 through ball joint linkage member 151. Quarter window assembly 134 pivots on a compound angle in order to improve the stowed packaging and also to follow the beltline opening and shape. Mechanically driving ball joint linkage member 151 by balance link 197 operably assists in achieving the desired quarter window assembly 134 motion.

When it is desired to move convertible roof system 101 from the raised position to the stowed position, the latch (not shown) connecting convertible roof system 101 to the front header of vehicle 100 is operated to release convertible roof system 101 from the front header. Actuator 205 is commanded to retract, which in turn pulls on bell crank 203 and causes balance link 197 to move rearwardly as it rotates about pivot 223. This rearward motion of balance link 197 causes rear roof rail 133 to move rearwardly about pivot 213 through the interaction of third linkage assembly 237. The movement of balance link 197 also drives movement of second linkage assembly 159 through drive link 185. Center roof rail 131 moves rearwardly with the movement of rear roof rail 133 and rotates about pivot 217 in a forward direction relative to rear roof rail 133.

Drive link 185 causes front roof rail 129 to move upwardly and rearwardly relative to center roof rail 131 through second linkage assembly 159. This motion results in front roof rail 129 remaining with its exterior surface facing up and moving to a position immediately above and adjacent to center roof rail 131 as convertible roof system 101 retracts. The movement of second linkage assembly 159 drives motion of first linkage assembly 157 through second link 181. First linkage assembly 157 thereby causes number one roof bow 137 to move upwardly and rearwardly relative to front roof rail 129 as first link 165 and second link 181 pivot about pivots 169, 173, respectively. The movement of number one roof bow 137 relative to front roof rails 129 results in number one roof bow 137 moving from a first position adjacent the front portion of front roof rails 129, as shown in FIGS. 1-3, to a second position adjacent the rear portion of front roof rails 129, as shown in FIGS. 7-9. As a result, number one roof bow 137 moves a distance D, as shown in FIG. 7, relative to the front end of front roof rail 129. Additionally, number one roof bow 137 moves vertically (as represented by indicia H in FIG. 4) relative to front roof rail 129 when moving between the first and second positions. This movement of number one roof bow 137 relative to front roof rail 129 allows number one roof bow 137 to be moved to a position rearward of rear seating area 111 and behind roll bar 115. If number one roof bow 137 did move relative to front roof rail 129, number one roof bow 137 would be in front of roll bar 115 and would extend transversely across rear seating area 111 of vehicle 100, thereby inhibiting and/or preventing an individual from occupying rear seating area 111 when convertible roof system 101 is in the retracted position.

As shown in FIGS. 7-9, when convertible roof system 101 is in the fully retracted position, a portion of front and center roof rails 129, 131 extend in a fore-and-aft direction along vehicle 100 adjacent rear seating area 111. This positioning does not interfere with occupying rear seating area 111. Additionally, as shown in FIGS. 7-8, at least a portion of convertible roof system 101 resides above belt line 117 of vehicle 100 when in the retracted position.

During the retraction process, backlite 128 falls into stowage compartment 107 as roof cover 127 loses tension and slack develops. Additionally, number four roof bow 153 rotates rearwardly about pivot 155 and also falls into stowage compartment 107 following backlite 128. Thus, at least a portion of convertible roof system 101 is stored in stowage compartment 107 when in the retracted position.

Quarter window assembly 134 rotates rearwardly about pivot 215 as convertible roof system 101 moves to the retracted position. Ball joint linkage member 151 moves rearwardly with the movement of balance link 197, thereby pulling on quarter window frame 149 and driving rotation about pivot 215. When in the retracted position, quarter window assembly 134 is stowed substantially beneath the belt line 117 of vehicle 100 and is adjacent rear seating area 111.

When it is desired to move convertible roof system 101 from the retracted position to the raised position, actuator 205 is commanded to cause the rod to extend therefrom to drive rotation of balance link 197 about pivot 223 in an upward and forward direction. This motion in turn drives first, second, and third linkage assemblies 157, 159, 237 in an opposite direction to that discussed above. As a result, front, center, and rear roof rails 129, 131, 133 move relative to one another and forwardly to return to the raised and operative position, as shown in FIGS. 1-3. Additionally, quarter window assembly 134 moves to the raised position. As roof cover 127 becomes taut, number four roof bow 153 and backlite 128 move out of stowage compartment 107 and to the fully raised position.

Thus, actuator 205 can drive the entire motion of convertible roof system 101 between the raised and retracted positions. It should be appreciated that while actuator 205 is shown as being a linear actuator, rotary actuators and/or electric actuators may also be employed to drive the motion of the linkages of convertible roof system 101. Furthermore, it should be appreciated that the actuators may be controlled by an electronic control unit. Additionally, devices such as limit switches, sensors, and/or potentiometers may be coupled to body 103 of vehicle 100, and to convertible roof system 101 to inform the control unit of the position of these components and their various linkages to ensure that their various components do not interfere with one another and that convertible roof system 101 and its associated actuators are properly controlled to move between the raised and stowed positions. An example of a suitable control system for convertible roof system 101, vehicle 100 and the various components thereon is that disclosed in U.S. Pat. No. 6,288,511 entitled, "Automotive Convertible Top System," issued to Porter et al., the disclosure of which is incorporated by reference herein.

Thus, convertible roof system 101 may provide many advantages. The movement of number one roof bow 137 relative to front roof rail 129 between the first and second positions allows for a reduced packaging space for convertible roof system 101. For example, if number one roof bow 137 were to be fixedly attached to the front portion of front roof rails 129, the front portion of front roof rails 129 would need to be rearward of any seating area that is desired to be occupied when convertible roof system 101 is in the retracted position. As such, the front portion of front roof rail 129 would need to be rearward of roll bar 115. This extra movement may cause convertible roof system 101 to extend rearwardly a significant distance relative to vehicle 100. As a result, a larger stowage compartment 107 may be necessary. Alternatively, a larger portion of convertible roof system 101 may extend rearwardly beyond rear hatch 113 of vehicle 100. Such rearward extension may be aesthetically non-pleasing. By moving number one roof bow 137 relative to front roof rail 129, through distance D, the extension of convertible roof system 101 rearward of roll bar 115 is reduced and the overhang of convertible roof system 101 may be reduced and provide a more aesthetically pleasing appearance.

Additionally, the movement of number one roof bow 137 is such that the exterior surface remains facing upwardly during the retraction process and when fully retracted. As a result, an aesthetically desirable appearance can be provided and number one roof bow 137 can cover a substantial portion of convertible roof system 101 when in the retracted position. Additionally, the movement of number one roof bow 137 vertically relative to front roof rail 129 during the retraction process can advantageously facilitate the clearing of a passenger seated in rear seating area 111 and roll bar 115 during the retraction process. The vertical extension of number one roof bow 137 relative to front roof rail 129 provides additional clearance and, as a result, does not require front roof rail 129 to be raised vertically as high as would be necessary to clear the passenger in rear seating area 111.

Thus, convertible roof system 101 allows for front and rear passenger seating areas 109, 111 to be retained in a shorter or smaller vehicle, when convertible roof system 101 is in the fully retracted position. Additionally, convertible roof system 101 can advantageously utilize at least a portion of the limited space in stowage compartment 107 to store at least a portion of convertible roof system 101 when in the retracted position. This ability to utilize at least a portion of stowage compartment 107 can reduce the amount of convertible roof system 101 that is above belt line 117 when in the retracted position.

Additionally, convertible roof system 101 advantageously couples the various roof rails 129, 131, 133 and number one roof bow 137 to one another with simple four-bar linkage assemblies 157, 159, 237. The use of four-bar linkage assemblies provides simple construction and motion control. Additionally, the use of the four-bar linkage assemblies facilitates the coordinating of the motion of the various components relative to one another and of the linkage assemblies relative to one another. Moreover, convertible roof system 101 can advantageously utilize a single set of actuators 205 on opposite sides of a vehicle to drive the entire range of motion of convertible roof system 101 between the raised and retracted positions. The use of a single pair of actuators can advantageously reduce the cost of the convertible roof system along with the maintenance thereof and can increase the reliability. Moreover, the movement of number one roof bow 137 relative to front roof rail 129 as top stack mechanism 125 retracts, advantageously reduces the time required to move convertible roof system 101 between the raised and retracted positions, as compared to the time required to provide these motions separately. In some embodiments it may be possible to replace the pair of actuators 205 with a single actuator.

It should be appreciated that while convertible roof system 101 disclosed herein is shown with reference to specific examples and configurations, variations in convertible roof system 101 can be employed without departing from the spirit and scope of the present invention. For example, rear quarter window assembly 134 can be decoupled from top stack mechanism 125. Additionally, convertible roof system 101 can be utilized on a vehicle having a fixed quarter window or a separately operable quarter window. Additionally, more or less of convertible roof system 101 can be stored in stowage compartment 107 when in the retracted position. Furthermore, the linkage assemblies and the links used herein can be configured in different arrangements and different shapes to provide a desired retraction packaging of convertible roof system 101. Additionally, the location and number of the pivots can also vary to provide a desired packaging and motion of convertible roof system 101. Further, while convertible roof system 101 is shown as having three pairs of roof rails, the convertible roof can have more or less roof rails depending upon the needs of the vehicle and the convertible roof to be placed thereon. Additionally, the distance D and H through which number one roof bow 137 moves can be changed to accommodate the vehicle upon which convertible roof system 101 is to be disposed. Moreover, convertible roof system 101 can be used on a vehicle having a seating area without a rear seating area.

Furthermore, it should be appreciated that while convertible roof system 101 is shown herein as being automatically actuated, the present invention can be utilized with manually operated convertible roof systems. Additionally, while the convertible roof system 101 shown herein is a soft-top convertible roof with a pliable cover, it should be appreciated that one or more panels may be employed as part of the convertible roof, although all of the benefits of the present teachings may not be realized. For example, reference should be made to U.S. Pat. No. 5,429,409, entitled, "Convertible Top," which is incorporated by reference herein. While various materials have been disclosed, it should be appreciated that alternate materials can be employed. It is intended by the following claims to cover these and any other departures from the disclosed embodiments which fall within the true spirit of this invention. Thus, one skilled in the art will readily recognize from such teachings and from the accompanying drawings and claims that various changes, modifications, and variations can be made therein without departing from the spirit and scope of the present invention.

What is claimed is:

1. An automotive vehicle convertible roof system comprising a cover and a top stack mechanism operable between a raised position and a stowed position, said top stack mechanism comprising:
   a forwardmost roof rail;
   a transversely extending roof bow; and
   links coupling said roof bow to said forwardmost roof rail;
   wherein said links allow said roof bow is to move between first and second positions relative to said forwardmost roof rail, and said links cause an entirety of said roof bow to move vertically relative to said forwardmost roof rail when moving between said first and second positions.

2. The convertible roof system of claim 1, wherein said links are part of a four-bar linkage assembly that couples said roof bow to said forwardmost roof rail, said linkage assembly controls the movement of said roof bow relative to said forwardmost roof rail, and said links are pivotally coupled to said forwardmost roof rail adjacent a central section of said rail.

3. The convertible roof of claim 1, wherein said top stack mechanism further includes a rearmost roof rail and a center roof rail coupled to said forwardmost and rearmost roof rails, and one of said links is directly pivotally coupled to said roof bow, said forwardmost roof rail, and said center roof rail.

4. The convertible roof of claim 1, wherein said four-bar linkage assembly is a first linkage assembly, said top stack mechanism further includes a four-bar linkage assembly coupling a center roof rail to said forwardmost roof rail, and one of said links is part of said four-bar linkage assembly.

5. The convertible roof system of claim 1, wherein said roof bow is adjacent a forward end portion of said forwardmost roof rail when in said first position and is adjacent a rearward end portion of said forwardmost roof rail when in said second position, and said forwardmost roof rail is substantially horizontal throughout its full range of movement.

6. The convertible roof system of claim 5, wherein said roof bow is a forwardmost one of a plurality of roof bows and said forwardmost roof bow is adjacent and entirely forward of a second one of said roof bows when in said stowed position.

7. The convertible roof system of claim 1, wherein an exterior of said roof bow faces upwardly in both of said first and second positions, wherein said top stack mechanism further comprises a second forwardmost roof rail and a second set of links directly pivotally coupling said roof bow to said second forwardmost roof rail.

8. The convertible roof system of claim 1, wherein said roof bow is above a seating area when said top stack mechanism is in said raised position and is rearward of said seating area when said top stack mechanism is in said stowed position.

9. The convertible roof system of claim 8, wherein a front end portion of said forwardmost roof rail is adjacent to and extends along a side of said seating area when said top stack mechanism is in said stowed position.

10. The convertible roof system of claim 8, wherein said roof bow is above a front seating area when said top stack mechanism is in said raised position and is rearward of a rear seating area when said top stack mechanism is in said stowed position.

11. The convertible roof system of claim 1, wherein a back lite is stored in a stowage area below a vehicular belt line and said forwardmost roof bow is above a belt-line when said top stack mechanism is in said stowed position.

12. An automotive vehicle convertible roof system comprising a cover and a top stack mechanism operable between a raised position and a stowed position, said top stack mechanism including:
   a forwardmost roof rail; and
   a forwardmost transversely extending roof bow;
   wherein said forwardmost roof bow is operable to move between first and second positions relative to said forwardmost roof rail, and said forwardmost roof bow moves between said first and second positions simultaneously with movement of said top stack mechanism between said raised and stowed positions; and
   wherein said forwardmost roof rail is substantially horizontal throughout its full range of movement.

13. The convertible roof system of claim 12, wherein said forwardmost roof bow moves between said first and second positions simultaneously with movement of said forwardmost roof rail.

14. The convertible roof system of claim 12, wherein top stack mechanism further includes a center roof rail and a rearmost roof rail, and said forwardmost roof bow moves between said first and second positions simultaneously with movement of said rearmost roof rail.

15. The convertible roof system of claim 12, wherein said forwardmost roof bow is adjacent a front end portion of said forwardmost roof rail when in said first position and is adjacent a rear end portion of said forwardmost roof rail when in said second position, and an upper surface of said forwardmost roof bow is upwardly facing in both said first and second positions.

16. The convertible roof system of claim 15, wherein said forwardmost roof bow is in said first position when said top stack mechanism is in said raised position and said forwardmost roof bow is in said second position when said top stack mechanism is in said stowed position, and said forwardmost roof bow is entirely forward of a number two roof bow when they are in said stowed position.

17. The convertible roof system of claim 12, further comprising a roll bar and a seating area, wherein said forwardmost roof bow is above said roll bar and said seating area when said top stack mechanism is in said raised position and is rearward of said roll bar and said seating area when said top stack mechanism is in said stowed position.

18. The convertible roof system of claim 17, wherein a front end portion of said forwardmost roof rail is adjacent to and extends along a side of said roll bar and said seating area when said top stack mechanism is in said stowed position.

19. The convertible roof system of claim 12, wherein said top stack mechanism further comprises:
   a center roof rail;
   a four-bar linkage assembly coupling said forwardmost roof rail to said center roof rail;
   a rear roof rail coupled to said center roof rail so that they fold in a clam-shelling manner; and
   a four-bar linkage assembly coupling said forwardmost roof bow to said forwardmost roof rail so that they fold in a substantially parallelogram-like manner.

20. An automotive vehicle convertible roof system comprising a cover and a top stack mechanism operable between a raised position and a stowed position, said top stack mechanism comprising:
   a pair of transversely spaced apart forwardmost roof rails;
   a pair of transversely spaced apart rearmost roof rails;
   a pair of center roof rails located between said forwardmost and rearmost roof rails when in said raised position;

at least one transversely extending roof bow operable to move between first and second positions relative to said pair of forwardmost roof rails;

substantially parallel links directly coupling each side portion of said roof bow to said forwardmost roof rails, said roof bow and said forwardmost and center roof rails all folding in a substantially parallelogram-like manner when viewed from each side; and at least one actuator operable to drive movement of said top stack mechanism between said raised and stowed positions and to drive movement of said at least one roof bow between said first and second positions.

21. The convertible roof system of claim 20, wherein said roof bow is above a seating area when said top stack mechanism is in said raised position and is rearward of said seating area when said top stack mechanism is in said stowed position, and said top stack mechanism further comprising a four-bar linkage assembly coupling each of said forwardmost roof rails to the adjacent of said center roof rails.

22. The convertible roof system of claim 21, wherein a front end portion of said pair of forwardmost roof rails is adjacent to and extends along transversely spaced apart sides of said seating area when said top stack mechanism is in said stowed position.

23. The convertible roof system of claim 20, wherein said at least one actuator is a pair of actuators, each of said actuators is operable to drive movement of a different side of said top stack mechanism and said roof bow, and said forwardmost and center roof rails are substantially horizontal when moved between said raised and stowed positions.

24. The convertible roof system of claim 20, wherein an entirety of said roof bow moves vertically relative to said pair of forwardmost roof rails when moving between said first and second positions.

25. The convertible roof system of claim 20, wherein said roof bow is adjacent a forward end portion of said pair of forwardmost roof rails when in said first position and is adjacent a rearward end portion of said pair of forwardmost roof rails when in said second position.

26. The convertible roof system of claim 20, wherein an exterior of said roof bow faces upwardly in both said first and second positions.

27. A method of operating an automotive vehicle convertible roof system having a top stack mechanism operable between raised and stowed positions, the top stack mechanism comprising a forwardmost roof rail and a number one transversely extending roof bow, the method comprising:

moving the number one roof bow relative to the forwardmost roof rail from a first position to a second position;

moving an entirety of the number one roof bow vertically relative to the forwardmost roof rail when moving the number one roof bow between the first and second positions; and preventing the number one roof bow and the forwardmost roof rail from inverting when they are moved between the raised and stowed positions.

28. The method of claim 27, further comprising controlling the movement of the number one roof bow relative to the forwardmost roof rail with a four-bar linkage assembly that couples the number one roof bow to the forwardmost roof rail.

29. The method of claim 28, further comprising driving movement of the linkage assembly with another four-bar linkage assembly that couples a center roof rail to the forwardmost roof rail and shares a link with the linkage assembly.

30. The method of claim 27, wherein moving the number one roof bow includes moving the number one roof bow from a first position adjacent a front end portion of the forwardmost roof rail to a second position adjacent a rear end portion of the forwardmost roof rail while maintaining the forwardmost roof rail in a substantially horizontal orientation.

31. The method of claim 27, wherein moving the number at least one roof bow includes moving the number one roof bow from a first position above a seating area and a roll bar to a second position rearward of the seating area and the roll bar.

32. The method of claim 31, further comprising moving the top stack mechanism from the raised position wherein a majority portion of the forwardmost roof rail is above the seating area to the stowed position wherein only a front portion of the forwardmost roof rail is adjacent to and extends along a side of the seating area and a remaining portion of the forwardmost roof rail is rearward of the seating area.

33. A method of operating an automotive vehicle convertible roof system having a top stack mechanism operable between raised and stowed positions, the top stack mechanism comprising a forwardmost roof rail, at least a second roof rail and a forwardmost transversely extending roof bow, the method comprising:

moving the top stack mechanism between the raised position and the stowed position;

moving the forwardmost roof bow relative to the forwardmost roof rail between a first position and a second position simultaneously with movement of the top stack mechanism between the raised and stowed positions; and moving the forwardmost roof bow from a forward to a rearward end of the forwardmost roof rail while raising the entire forwardmost roof bow relative to the entire forwardmost roof rail by pivoting links coupling an end portion of the forwardmost roof bow to a middle section of the forwardmost roof rail.

34. The method of claim 33, wherein moving the forwardmost roof bow includes moving the forwardmost roof bow from a first position above a seating area and a roll bar to a second position rearward of the seating area and the roll bar.

35. The method of claim 33, further comprising moving the top stack mechanism from the raised position wherein a majority portion of the forwardmost roof rail is above a seating area to the stowed position wherein only a front portion of the forwardmost roof rail is adjacent to and extends along a side of the seating area and a remaining portion of the forwardmost roof rail is rearward of the seating area.

36. The method of claim 33, further comprising:

folding a rearmost roof rail relative to the second roof rail in a clamshelling manner;

folding a pliable top covering the top stack mechanism when the top stack mechanism moves from the raised to the stowed positions;

folding the forwardmost roof bow relative to the forwardmost roof rail in a substantially parallelogram-like manner; and folding the forwardmost roof rail relative to the second roof rail in a substantially parallelogram-like manner.

37. A method of operating an automotive vehicle convertible roof system having a top stack mechanism operable between raised and stowed positions, the top stack mechanism having a pair of transversely spaced apart forwardmost roof rails, a pair of transversely spaced apart rearmost roof rails, at least one transversely extending roof bow, and at least one actuator, the method comprising:

moving the top stack mechanism between the raised and stowed positions with the at least one actuator;

moving the at least one roof bow relative to the forwardmost pair of roof rails between first and second positions with the at least one actuator moving at least one four-bar linkage to vertically raise and rearwardly retract the roof bow relative to the forwardmost roof rails; and moving at least one four-bar linkage to fold center roof rails relative to the forwardmost roof rails.

38. The method of claim 37, wherein the at least one roof bow is a number one roof bow, further comprising clamshell folding rear roof rails coupled to the center roof rails.

39. The method of claim 37, wherein moving the top stack mechanism includes moving the top stack mechanism from the raised position wherein a majority portion of the forwardmost pair of roof rails is above a seating area to the stowed position wherein only a front portion of the forwardmost pair of roof rails is adjacent to and extends along transversely spaced apart sides of the seating area and a remaining portion of the forwardmost pair of roof rails is rearward of the seating area.

40. The method of claim 37, wherein moving the at least one roof bow includes moving the at least one roof bow from a first position adjacent a front end portion of the forwardmost pair of roof rails to a second position adjacent a rear end portion of the forwardmost pair of roof rails.

41. The method of claim 37, wherein the at least one actuator is a pair of actuators, moving the top stack mechanism includes driving movement of different transversely spaced apart sides of the top stack mechanism with different ones of the pair of actuators, and moving the at least one roof bow includes driving movement of different transversely spaced apart sides of the at least one roof bow with different ones of the pair of actuators, and preventing the first two of the roof bows from inverting during movement between the raised and stowed positions.

* * * * *

UNITED STATES PATENT AND TRADEMARK OFFICE
CERTIFICATE OF CORRECTION

| | |
|---|---|
| PATENT NO. | : 7,857,373 B2 |
| APPLICATION NO. | : 12/120571 |
| DATED | : December 28, 2010 |
| INVENTOR(S) | : Christopher J. Dilluvio and Bradley R. Garska |

It is certified that error appears in the above-identified patent and that said Letters Patent is hereby corrected as shown below:

Column 1, line 35, "beitline" should be --beltline--.

Column 9, line 13, Claim 1, after "bow", delete "is".

Signed and Sealed this

Thirteenth Day of September, 2011

David J. Kappos
*Director of the United States Patent and Trademark Office*